G. GRINDROD.
PROCESS FOR EMULSIFYING LIQUIDS.
APPLICATION FILED AUG. 12, 1919.
1,435,464.
Patented Nov. 14, 1922.
3 SHEETS—SHEET 1.
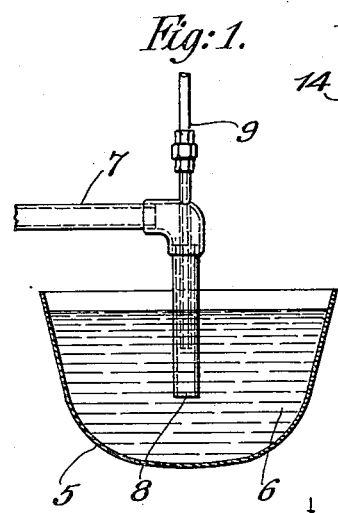
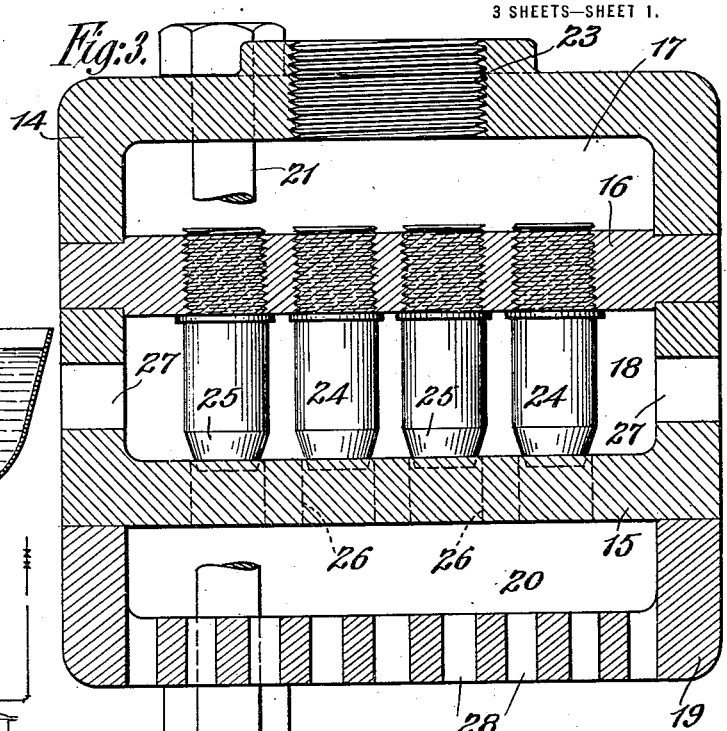
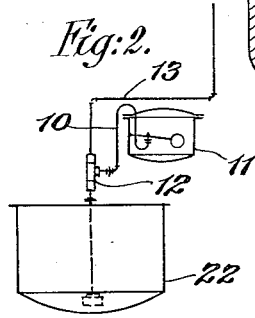
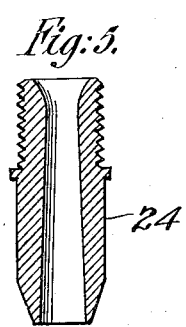
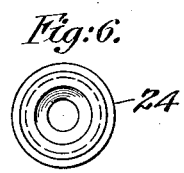
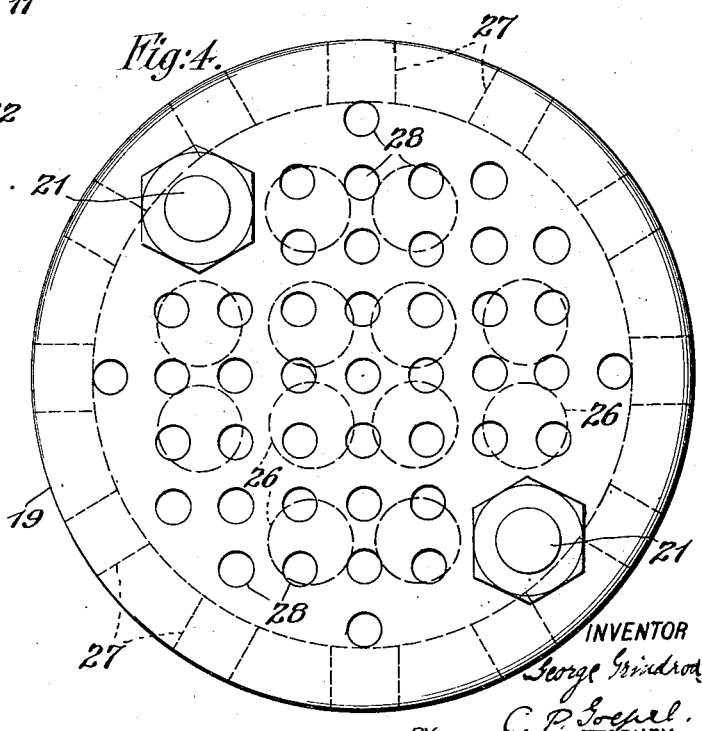

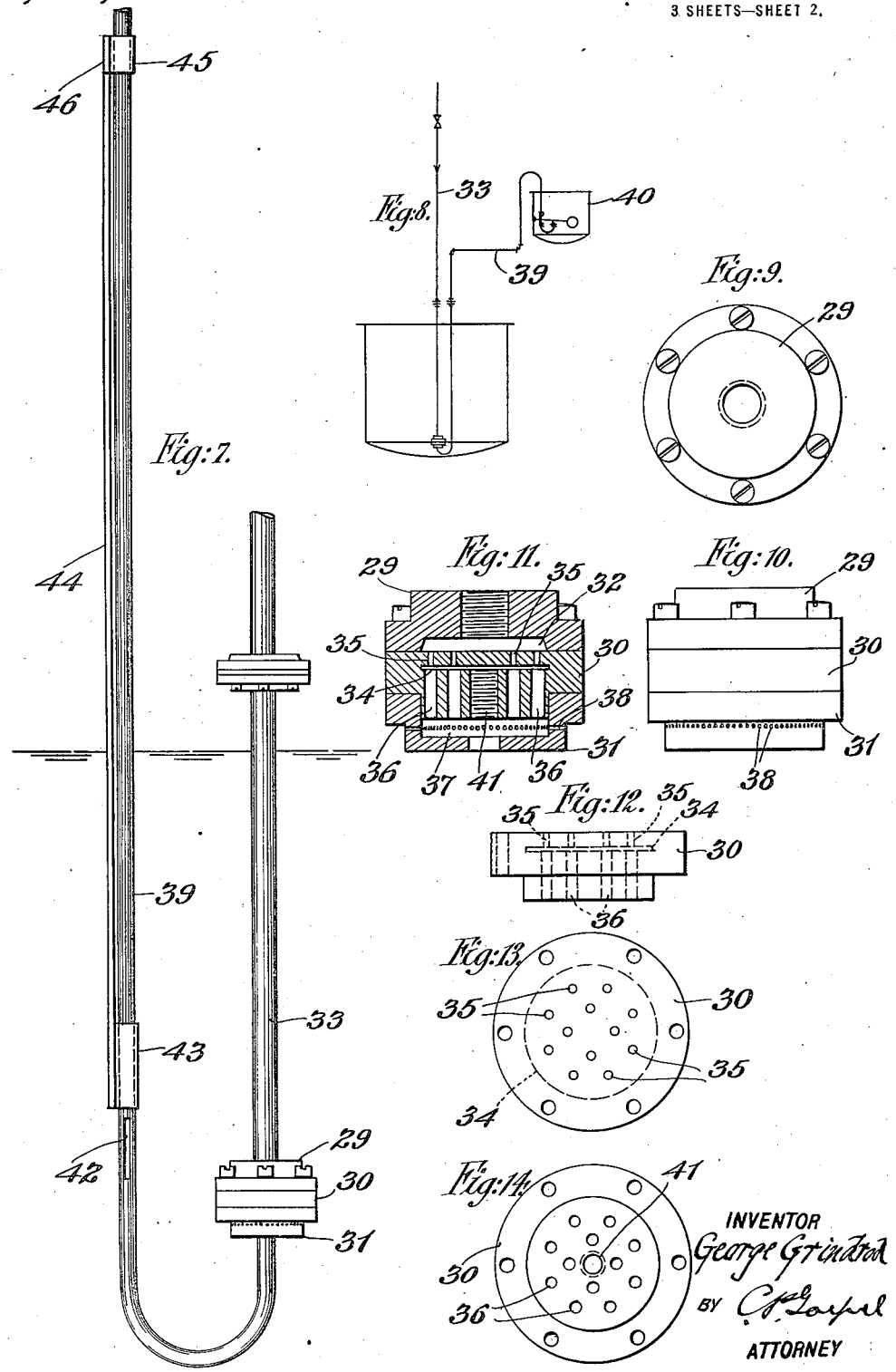

G. GRINDROD.
PROCESS FOR EMULSIFYING LIQUIDS.
APPLICATION FILED AUG. 12, 1919.
1,435,464.
Patented Nov. 14, 1922.
3 SHEETS—SHEET 3.
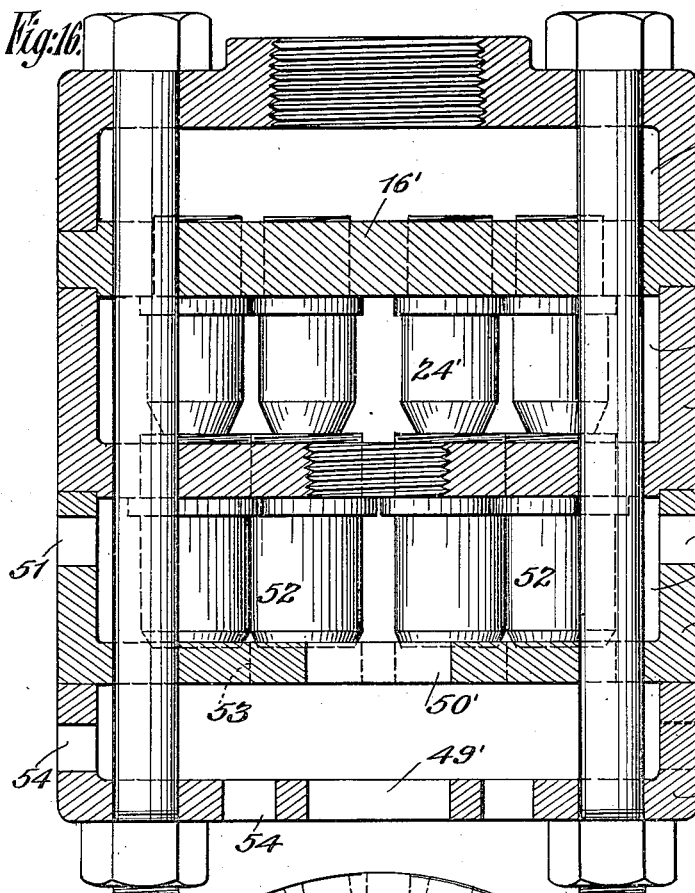
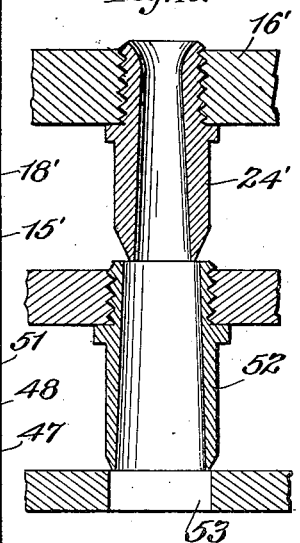
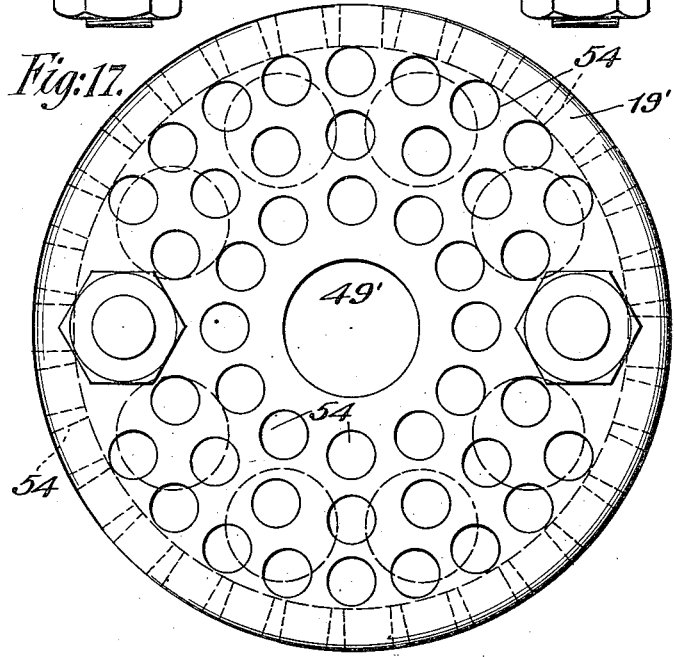
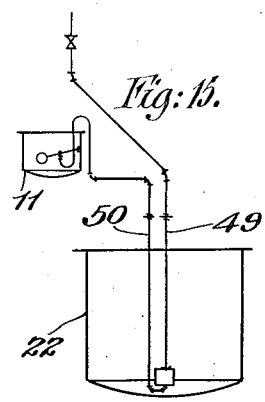
INVENTOR
George Grindrod
BY C. P. Goepel.
ATTORNEY Patented Nov. 14, 1922.

1,435,464

UNITED STATES PATENT OFFICE.

GEORGE GRINDROD, OF OCONOMOWOC, WISCONSIN, ASSIGNOR TO CARNATION MILK PRODUCTS COMPANY, OF CHICAGO, ILLINOIS, A CORPORATION OF DELAWARE.

PROCESS FOR EMULSIFYING LIQUIDS.

Application filed August 12, 1919. Serial No. 316,966.

*To all whom it may concern:*

Be it known that I, GEORGE GRINDROD, a citizen of the United States of America, and a resident of Oconomowoc, in the county of Waukesha and State of Wisconsin, having invented certain new and useful Improvements in a Process for Emulsifying Liquids, do hereby declare that the following is a full, clear, and exact description of the same.

This invention relates to an improved process for emulsifying and homogenizing liquids and more particularly a fatty liquid with milk constituents.

It is the primary object of my invention to provide a process of emulsification wherein the explosive power of condensing steam is effectively utilized for the purpose of subdividing the fat into minute globules.

It is also an important feature of the improved process to force or inject the subdivided fat directly into the body of the emulsifying liquid and continue the accretion of coagulated albumen upon the fat globules in the mass of emulsifying liquid.

The invention further contemplates a final breaking or subdivision of the fat globules after injection into the emulsified liquid and the deposit of further albumen coagulations upon the subdivided fat nuclei to thereby preclude the possibility of coalescence.

It is proposed as a novel step of my improved process to break up or subdivide the fat at the instant of the greatest difference in surface tension between the fat and the surrounding liquid to thereby most effectively divide the fat into minute globules.

With the foregoing and other objects in view, the invention consists in the improved process as above characterized and which will be hereinafter more fully described, illustrated in the accompanying drawings, and subsequently incorporated in the subjoined claims.

In the drawings wherein similar reference characters designate corresponding parts throughout the several views, Fig. 1 is a sectional view through a forewarmer, illustrating a very simple form of apparatus by means of which the emulsification process may be successively practiced;

Fig. 2 is a diagrammatic view illustrating another form of apparatus which may be employed;

Fig. 3 is a vertical sectional view of the emulsifying means used in connection with the apparatus shown in Fig. 2;

Fig. 4 is a bottom plan view;

Fig. 5 is a sectional view of one of the steel nozzles.

Fig. 6 is an end elevation of the nozzle.

Fig. 7 is an elevation illustrating another way in which the fat and milk may be supplied to the emulsifying means;

Fig. 8 is a diagrammatic view showing a modified form of apparatus in which the device illustrated in Fig. 7 is employed;

Fig. 9 is a plan view of the emulsifying device shown in Fig. 7;

Fig. 10 is a side elevation thereof;

Fig. 11 is a vertical sectional view;

Fig. 12 is an elevation of a part of the emulsifying device which is provided with the liquid film receiving chamber and the steam jet orifices;

Fig. 13 is a top plan view of the part shown in Fig. 12;

Fig. 14 is a bottom plan view thereof;

Fig. 15 is a diagrammatic view illustrating still another form of apparatus;

Fig. 16 is a vertical sectional view through the emulsifying means employed in connection with the apparatus shown in Fig. 15;

Fig. 17 is a bottom plan view thereof; and

Fig. 18 is a detail sectional view of one pair of the associated steam nozzles shown in Fig. 16.

It is the purpose of the present invention to provide an improved process whereby the liquid fat, preferably cocoanut fat, is broken up into minute globules and these globules enveloped by a colloid of coagulated albumen in a state of maximum hydration, and to thereby obtain a very thorough emulsification of the fatty fluid with the milk constituents.

In Fig. 1 of the drawings, I have disclosed an apparatus of the simplest embodiment for accomplishing the desirable result above referred to. In this figure, 5 designates the fore-warmer which is a receptacle of any desired form and capacity and is adapted to receive skim milk, indicated at 6. Through the pipe 7 liquid fat, (such as cocoanut fat) is supplied to the skim milk in the fore-warmer from a suitable tank or reservoir, the outlet end 8 of said pipe being disposed a considerable distance below the surface of the skim milk 6. From a suitable source of supply, live steam is ejected into the downwardly extending outlet end of the pipe 7 through pipe 9; the point of emission of the live steam being suitably spaced from the outlet end 8 of the pipe 7.

In the operation of the apparatus, the live steam in impinging upon the liquid fat breaks up or atomizes the fat and subdivides the same into minute globules. It will be understood that these fat globules practically become incorporated in the steam. Thus as the steam and fat issue from the outlet end 8 of the pipe into the surrounding body of relatively cool skim milk, the steam will condense and in condensing the globules of steam will collapse with explosive force. The explosive force of the bursting steam globules upon the enclosed fat exerts a further disrupting action upon the latter so that the fat globules are further subdivided, and form nuclei upon which, by a process of accretion the coagulating albumen of the surrounding skim milk is deposited and forms an enveloping colloidal film. This process continues and by the further building up of molecular aggregates of the coagulating albumen upon the fat nuclei, a thorough emulsification of the fatty constituents with the milk constituents is effected.

In Fig. 2 of the drawings, I have illustrated another form of apparatus which may be employed and wherein the fat-supply pipe 10 leading from the tank or reservoir 11 is connected to a large injector 12 which is interposed in the steam supply pipe 13.

The fat containing tank or reservoir 11 is airtight and is equipped with a suitable gauge. This tank is filled almost to the top with liquid fat, the fat chamber being first evacuated so as to expel the air therefrom to thereby prevent the formation of fatty acids which might occur in the presence of air and moisture. After the tank has been filled with the liquid fat an inert gas is admitted to the chamber to destroy the vacuum and force the liquid through the pipe 10 to the injector 12.

In this form of the apparatus I employ an emulsifier shown in detail in Fig. 3. As therein illustrated this emulsifier consists of a top section 14 and a similar intermediate section 15 disposed in reverse relation to the section 14. Between these two sections of the emulsifier a nozzle-carrying plate 16 is interposed and in conjunction with said sections forms the chambers 17 and 18 respectively. 19 designates the bottom or base section of the emulsifier which in conjunction with the section 15 forms a third chamber 20. The several sections 14, 15 and 19, and the plate 16 are securely held in assembled relation by means of a plurality of vertical tie-bolts 21.

The lower end of the steam supply pipe 13 which extends downwardly into the mass of emulsifying liquid contained in the fore-warmer 22 is connected to the inlet port 23, of the section 14 of the emulsifier whereby the fat and steam are admitted to the chamber 17 as will be hereinafter explained. A series of injector nozzles 24 are threaded in the plate 16 and extend downwardly therefrom. The lower tapered ends 25 of these nozzles extend into the upper ends of openings 26 provided in the section 15. The annular wall of this section is further provided with a series of openings 27 through which milk is admitted from the forewarmer into the chamber 18.

In this form of the apparatus the bottom wall of the section 19 of the emulsifier is provided with a plurality of relatively small openings 28.

In the operation of the apparatus just described, when the steam is turned on, the injector 12 through which the steam passes under high pressure draws the fat from the tank or reservoir 11 and reduces the fat to an atomized condition. The atomized fat and the steam are discharged into the chamber 17 of the emulsifier and pass through the several nozzles 24. The steam and fat issue from the nozzles 24 into the openings 26 and as they enter these openings the film of milk in the chamber 18 upon the surface of the bottom wall of the section 15 is also drawn into these openings and broken up so that it becomes intermixed with the fat globules, and issues from said openings together with the fat and steam in the form of a plurality of jet sprays into the chamber 20. As the milk constituents enter the openings 26 and are broken up or atomized they are subjected to the high heat of the steam and raised to or above a boiling temperature so that the albumen of the milk is coagulated and having an affinity for the fat globules tends to collect thereon in the form of a thin colloidal film, and thereby prevents coalescing of the fat globules with each other. It is due to the condition thus produced that the permanency of the subsequently formed emulsion is assured. The steam, carrying the fat and milk constituents, is delivered with considerable impact across the chamber 20 and against the wall of the section 19 of the emulsifier. The fat globules are thus further broken up and any insufficiency in the atomization of the fat by means of the steam is compensated for. The atomized constituents of the fat and milk incorporated in the steam globules then pass through the openings 28 into the surrounding mass of relatively cool skim milk contained in the fore-warmer. Here, condensation of the steam takes place. I have found in practice that the impactive force exerted by the condensing steam globules upon the fat serves to disrupt the latter and subdivide the same into globules of minute size. This action occurs at two different points. First, upon the entrance of milk into the openings 26 and the ejector chamber 20, the water in the milk causes a partial condensation of the steam. The explosive violence of the condensing steam tends to break up such fat as may have escaped atomization, which breaking up action is furthered by the impact of the fat and milk constituents against the perforated wall of the emulsifier section 19. Secondly, after the constituents are ejected by the steam through the openings 28 into the cool mass of skim milk, the final condensation of the remaining steam occurs, and as the steam globules collapse, the fat which is incorporated therein receives the full impactive effect so that any fat which has escaped complete subdivision at the previous stages of the process will be finally broken at this point, thereby providing additional nuclei upon which the albumen coagulations of the surrounding milk are deposited. Thus coalescence of the subdivided fat in its final emulsification with the milk is rendered impossible.

In Figs. 7 to 14 inclusive, I have illustrated another form of apparatus for practicing my improved process which, for practical reasons of simplicity in construction and economic manufacture, I deem preferable. In this construction, the fat is not admitted to the steam supply pipe and delivered to the emulsifier separately from the milk, but the milk and fat are delivered together in desirable predetermined proportions to the emulsifier and are simultaneously acted upon by a plurality of steam jets. To this end I provide an emulsifier of the construction illustrated in Fig. 11, and consists of a top section 29, an intermediate section 30 and a base section 31, the several sections being assembled and secured together by means of tie-bolts or other suitable fastening elements. The top section 29 is provided in its bottom face with a chamber 32 into which the live steam is delivered through the pipe 33. The intermediate section 30 of the emulsifier is formed with a very narrow chamber 34 to receive a thin film of skim milk and fat. A plurality of jet orifices 35 afford communication between this chamber and the steam receiving chamber 32. The section 30 of the emulsifier is further provided with a plurality of expansion chambers 36 in line with the jet orifices 35 but of appreciably larger diameter than said orifices. These expansion chambers 36 open at their lower ends into the ejector chamber 37 of the section 31 of the emulsifier. The annular wall of this chamber is provided with a plurality of transverse openings 38 through which the liquids are ejected radially into the surrounding body of skim milk in the fore-warmer.

The fat-supply pipe 39 leading from the tank or reservoir 40 extends downwardly into the fore-warmer below the emulsifier and then upwardly through a central opening in the section 31 and is centrally connected to a threaded socket or opening 41 provided in the section 30 of the emulsifier, and which communicates with the chamber 34. The fat-supply pipe 39 is provided in that portion submerged in the body of skim milk with an elongated opening or slot 42 through which the skim milk may enter and be carried with the fat to the chamber 34 of the emulsifier. A regulating valve sleeve 43 is engaged upon the pipe 39 and is provided with a stem or rod 44 which extends along the pipe to a point considerably above the surface of the contents of the fore-warmer, and is provided at its upper end with a guide sleeve 45 loosely surrounding the pipe and with a suitable handle 46 whereby the valve sleeve 43 may be raised or lowered to expose or close a desired portion of the slot 42. For the purpose of ascertaining in an accurate manner the amount of skim milk which is permitted to enter through said slot into the pipe 39, a suitably graduated scale may be provided on the pipe 39 with respect to which the handle 46 is adapted to be positioned.

In the operation of this form of apparatus, the steam is delivered through the pipe 33 into the chamber 32 and passes through the orifices 35 at a velocity of approximately 1400 feet per minute. A vacuum is thus formed in the space or chamber 34, and fat and skim milk are drawn through the pipe 39 upwardly into said space. The two liquids are not however intimately mixed before entering this chamber and it is immaterial whether they enter through the same tube as in this embodiment of the apparatus or through different tubes or passages so long as suitable quantities of each liquid are drawn into the chamber. However, for simplicity of construction the liquids are preferably drawn through the same tube.

The liquids are distributed in the chamber or space 34 in the form of a thin film so that they are acted upon by the steam jets passing through said chamber. As these jets at high velocity enter the expansion chambers 36, they tear or break away successive portions of the liquid film as it is constantly renewed, and atomize such portions. As previously stated the milk particles are raised to a boiling temperature during this atomizing process so that the albumen of the milk is coagulated and collects upon the surface of the atomized fat globules. The further treatment of the liquids is substantially identical with that above explained. In other words, the fat and milk constituents are delivered into the ejector chamber 37 and finally pass through the openings 38 into the surrounding body of emulsifying liquid where the final subdivision of the fat takes place due to the impactive force of the condensing steam, resulting in the thorough and permanent emulsification of the liquid constituents.

In Figs. 15 to 18, inclusive, I have illustrated still another alternative form of the apparatus which is quite similar to that illustrated in Fig. 3. As shown in Fig. 16, however, in this instance the emulsifier is provided with an additional section 47, affording a second injector chamber 48. The section 47 is interposed between the section 15' and the section 19' of the emulsifier. This form of the apparatus also differs from those previously described in that the steam, fat and milk are respectively delivered to separate chambers of the emulsifier. Thus, as shown, in Fig. 15, the steam supply pipe 49 delivers steam to the top chamber 17' of the emulsifier while the pipe 50 extending downwardly through the milk in the fore-warmer is extended upwardly through openings 49' and 50', respectively, in the base section 19' and section 47 of the emulsifier and is connected to the bottom wall of the section 15' to supply the liquid fat to the chamber 18'. The milk enters from the fore-warmer through openings 51 in the annular wall of the section 47 and collects in the chamber 48.

A series of injector nozzles 24' are mounted in the plate 16' as in the apparatus shown in Fig. 3, and in the bottom wall of section 15' a similar series of nozzles 52 are mounted. The latter nozzles are disposed in axial alignment with the corresponding nozzles 24' but are of somewhat greater diameter than the nozzles 24'. The lower ends of the nozzles 52 are disposed in concentric relation to openings 53 in the bottom wall of the section 47.

In the above arrangement, when the steam is turned on, in its passage through the nozzles 24' and into the nozzles 52, it draws the fat from the chamber 18' and atomizes the fat as it enters the nipples 52. The steam in passing through these latter nipples and the openings 53 tends to produce a vacuum in the chamber 48 and thus draw the milk film on the bottom wall of the section 47 into the openings 53 so that the albumen in the milk is coagulated around the fat globules owing to the atomization of the milk and the increase in temperature thereof. From this point, the operation is substantially the same as in the previously described forms of the apparatus. However, as shown in Fig. 16, in addition to the openings in the bottom wall of the base section 19' of the emulsifier I may also provide lateral openings 54 in the side wall thereof through which the milk and fat constituents are ejected under high pressure into the surrounding body of milk in the fore-warmer. Here the condensation of the steam and further subdivision of the fat globules takes place in the manner above explained.

In each of the above described forms of the emulsifier shown in Figs. 3, 11 and 16, respectively, I may, if desired, dispense with the lowermost section thereof and permit the steam and fat globules to enter directly into the body of surrounding milk. However, the use of this base section having the ejector chamber is desirable since by the impact of the fat globules against the wall of said chamber a further breaking up of the fat globules will result before the final subdivisions thereof in the liquid contained in the fore-warmer.

In the operation of each form of the apparatus, it is essential that the fat intake and the milk intake shall be so proportioned that the required fat is introduced before the temperature of the mass of milk advances beyond 160 degrees Fahr., which is the coagulating point of albumen.

The use of the parallel injectors is an important feature of the invention, as they greatly increase the area of contact between the steam and the liquids. Thus a large number of small jets each delivering a certain amount of steam affords greater area of steam impingement upon the liquids than the same amount of steam passing through a single jet and so permits a greater relative proportion of the force of the steam to exert its action in disrupting the fat and milk into fine globules or particles. This extensive subdivision of the liquids is obtained in each form of the apparatus which I have herein described. In the form shown in Fig. 11, the separate steam jet nozzles are entirely dispensed with but their function and purpose as above referred to is subserved by the provision of the jet orifices 35 in the wall of the section 30 of the emulsifier.

From the foregoing description considered in connection with the accompanying drawings, it will be appreciated by those conversant with the art, that my improved process is quite distinct from similar processes, as heretofore proposed, in that there is obtained a subdivision of the fat at three different points and in three different stages or conditions of the fatty fluid. This repeated subdivision of the fat insures great uniformity and minuteness and in practice has been found to prevent any fat globules from passing into the body of emulsifying liquid without being reduced to the size represented or determined by the power contained in the steam. Thus steam at fifty pounds pressure will subdivide the fat to a maximum globule diameter of approximately 0.02 mm.

The process which I have herein described I also believe to be a distinct advance in the art, in that the subdivided fat is forced or injected directly into the bulk of the emulsifying liquid where the building or accretion of albumen coagulation is continued upon the fat nuclei after the latter are suspended in the greater mass of the emulsifying liquid.

The several alternative forms of the apparatus to which I have above referred and whereby I have successfully performed the several steps of the process are to be understood as merely suggestive. This apparatus is not herein claimed as it constitutes a separate subject matter of invention and is described and claimed in a separate application for patent which constitutes a division of this application. The apparatus may obviously be exemplified in many other constructions, and it is accordingly to be understood that I reserve the privilege of adopting all such legitimate modifications as may be fairly embodied within the spirit and scope of the invention as claimed.

I claim:

1. An emulsifying process which consists in subjecting liquid fat to the action of steam under pressure to thereby subdivide the fat into globules and then engaging the steam and fat globules into a body of emulsifying liquid to increase the temperature of the liquid adjacent to the fat globules and thereby cause the coagulation of the liquid constituents upon the fat globules in the form of a colloidal film.

2. An emulsifying process which consists in subjecting liquid fat to the action of steam under pressure to initially subdivide the fat into globules, secondly again subdividing the fat globules by impact, and finally injecting the steam and fat globules into a body of relatively cool emulsifying liquid whereby the condensing steam exerts a disruptive force upon the globules to effect a third subdivision thereof and by increasing the temperature of the liquid causes the coagulation of the liquid constituents and their deposition upon the fat nuclei.

3. An emulsifying process which consists in subjecting liquid fat and milk to the action of steam under pressure to subdivide the fat into globules and envelop said globules in a colloidal film of coagulated albumen, and then injecting the steam and film enclosed fat globules into a body of milk, the temperature of which is increased by the steam to cause the further accretion of coagulated albumen upon the fat globules.

4. An emulsifying process which consists in subjecting liquid fat and milk to the action of steam under pressure to subdivide the fat into globules and envelop said globules in a colloidal film of coagulated albumen, disrupting the film enclosed fat globules by subjecting the same to impactive force and finally injecting the steam and the subdivided globules into a body of milk the temperature of which is increased by the steam to cause the further accretion of coagulated albumen upon the fat nuclei.

5. An emulsifying process which consists in subjecting a film of liquid fat and milk to the action of steam under pressure, to subdivide the fat into globules and increase the temperature of the milk whereby the fat globules are enclosed within films of coagulated albumen, causing the disruption of said globules by impactive force, and finally injecting steam and disrupted fat globules into a body of relatively cool milk to cause a third subdivision of the fat by the disrupting action of condensing steam, and simultaneously increasing the temperature of the milk to effect the further accretion of coagulated albumen upon the fat nuclei.

6. In the emulsification of liquids, that step which consists in subjecting a liquid film to the action of steam under pressure and thereby breaking up the film into a multiplicity of atomized jets to subdivide the liquid into minute globules.

7. In the emulsification of fluids, that step which consists in subjecting a liquid film composed of fat and milk constituents to the action of steam under pressure and breaking up the film into a multiplicity of atomized jets to thereby simultaneously subdivide the fat into minute globules and, by the heat of the steam, coagulate the albumen constituents of the milk so that the latter by accretion form enclosing films surrounding the fat globules.

8. In the emulsification of liquids, that step which consists in injecting liquid globules and steam into a body of relatively cool emulsifying liquid whereby the steam in condensing delivers an impactive force upon the globules and effects a subdivision thereof.

9. In the emulsification of liquids, that step which consists in subjecting liquid globules to the impactive force of condensing steam globules whereby such liquid globules are subdivided to form nuclei for accretions of an emulsifying liquid.

10. In the emulsification of liquids, that step which consists in injecting subdivided fat globules into a body of milk and simultaneously heating the milk in the vicinity of the fat globules to cause the accretion of the coagulated albumen thereon.

11. In the emulsification of liquids, that step which consists in injecting a subdivided fatty liquid by steam under pressure into a body of milk of relatively low temperature, whereby the albumen constituent of the milk is heated by the steam, the steam simultaneously condensing and exerting a disruptive force upon the fat particles to form nuclei for the accretion thereon of the coagulated albumen in a maximum state of hydration.

12. An emulsifying process which consists in subjecting a liquid film of fat and milk to the action of a plurality of jets of steam under pressure, whereby the fat is divided into globules and the temperature of the milk simultaneously increased to coagulate the albumen constituent thereof upon the fat globules.

13. In the emulsification of liquids, that step which consists in injecting liquid globules and a condensable vapor into a body of liquid of such temperature as to cause condensation of the vapor to effect a minute subdivision of the globules.

14. In the emulsification of liquids, that step which consists in utilizing the impactive force resulting from the condensation of a vapor to effect a minute subdivision of liquid globules.

15. In the emulsification of liquids, that step which consists in subjecting liquids of different characters, successively to the action of steam under pressure to effect emulsification of the liquids.

16. In the emulsification of liquids, subjecting a fatty liquid to the action of steam under pressure and then subjecting milk to the action of the steam and fatty liquid, to form an emulsion of the fatty liquid and the milk.

17. In the emulsification of liquids, subjecting a fatty liquid to the action of steam, to divide it into globules and then utilizing the steam to raise the temperature of another liquid, and to cause certain of the constituents of the last mentioned liquid to coagulate about the globules of the fatty liquid.

18. In the emulsification of liquids, that step which consists in bringing a fatty liquid and milk together in the presence of steam so as to cause the coagulation of albumen in the milk about the globules of the fatty liquid.

In testimony that I claim the foregoing as my invention, I have signed my name hereunder.

GEORGE GRINDROD.